US012279066B2

(12) United States Patent
Chen et al.

(10) Patent No.: US 12,279,066 B2
(45) Date of Patent: Apr. 15, 2025

(54) PANORAMA GENERATION WITH MOBILE CAMERA

(71) Applicant: Google LLC, Mountain View, CA (US)

(72) Inventors: Lin Chen, Mountain View, CA (US); Wei (Alex) Hong, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 292 days.

(21) Appl. No.: 17/906,691

(22) PCT Filed: Jun. 2, 2020

(86) PCT No.: PCT/US2020/035692
§ 371 (c)(1),
(2) Date: Sep. 19, 2022

(87) PCT Pub. No.: WO2021/247006
PCT Pub. Date: Dec. 9, 2021

(65) Prior Publication Data
US 2023/0142865 A1    May 11, 2023

(51) Int. Cl.
*H04N 5/265* (2006.01)
*G06T 7/00* (2017.01)
(Continued)

(52) U.S. Cl.
CPC ........... *H04N 5/265* (2013.01); *G06T 7/0002* (2013.01); *G06V 10/16* (2022.01); *G06V 10/25* (2022.01);
(Continued)

(58) Field of Classification Search
CPC . G06T 2207/20212; G06T 2207/30168; G06T 2207/30201; G06T 3/4038;
(Continued)

(56) References Cited

U.S. PATENT DOCUMENTS 9,549,125 B1 * 1/2017 Goyal .................. H04N 23/743
2010/0118205 A1 5/2010 Sohma et al.
2012/0294549 A1 11/2012 Doepke

FOREIGN PATENT DOCUMENTS

JP  2010118868 A   5/2010
JP  2014519739 A   8/2014
(Continued)

OTHER PUBLICATIONS

Silv'en et al. ("New Video Applications on Mobile Communication Devices", Proceedings vol. 6821, Multimedia on Mobile Devices 2008; 682108 (2008) https://doi.org/10.1117/12.764872 , Event: Electronic Imaging, 2008, San Jose, California, United States, Feb. 27, 2008).*

(Continued)

*Primary Examiner* — Dakshesh D Parikh
(74) *Attorney, Agent, or Firm* — McDonnell Boehnen Hulbert & Berghoff LLP

(57) ABSTRACT

Devices and methods for selecting and stitching image frames are provided. A method includes obtaining a plurality of image frames. The method also includes identifying one or more regions of interest within one or more image frames in the plurality of image frames. The method further includes selecting, based on a respective quality measure associated with each image frame of the plurality of image frames, a set of base frames, where each identified region of interest of the one or more identified regions of interest is fully contained within at least one base frame in the selected set of base frames. The method additionally includes stitching together the selected set of base frames to create a composite image.

21 Claims, 8 Drawing Sheets

(51) Int. Cl.
  *G06V 10/10*  (2022.01)
  *G06V 10/25*  (2022.01)
  *G06V 40/16*  (2022.01)
  *H04N 23/698*  (2023.01)

(52) U.S. Cl.
  CPC ......... *G06V 40/161* (2022.01); *H04N 23/698* (2023.01); *G06T 2207/20212* (2013.01); *G06T 2207/30168* (2013.01); *G06T 2207/30201* (2013.01)

(58) Field of Classification Search
  CPC ...... G06T 7/0002; G06V 10/16; G06V 10/25; G06V 40/161; H04N 23/698; H04N 5/265
  See application file for complete search history.

(56) References Cited

FOREIGN PATENT DOCUMENTS

| | | |
|---|---|---|
| KR | 20180006368 A | 1/2018 |
| WO | 2016/191554 A1 | 12/2016 |

OTHER PUBLICATIONS

Herrmann et al. ("Object-centered image stitching", Proceedings of the European Conference on Computer Vision (ECCV), 2018, pp. 821-835).*
Boutellier et al., "Panoramas from Partially Blurred Video," Advances in Machine Vision, Image Processing, and Pattern Analysis Lecture Notes in Computer Science, Jan. 2006, pp. 300-307.
Herrmann et al., "Object-Centered Image Stitching," Advances in Databases and Information Systems, Oct. 2018, pp. 846-861.
International Searching Authority, International Search Report and Written Opinion mailed on Feb. 22, 2021, issued in connection with International Patent Application No. PCT/US2020/035692, filed Jun. 2, 2020, 15 pages.
Silven et al., "New Video Applications on Mobile Communication Devices," Proceedings of SPIE, Multimedia on Mobile Devices, Feb. 2008, pp. 682108-1 to 682108-14, vol. 6821.
The Korean Intellectual Propety Office, Office Action mailed on Jan. 16, 2024, issued in connection with Korean Patent Application No. 10-2022-7042960, filed Dec. 7, 2022, 73 pages (with English Translation).
Japanese Patent Office, Office Action mailed on Jan. 9, 2024, issued in connection with Japanese Patent Application No. 2022-567146, 15 pages (English Translation).

* cited by examiner

PANORAMA GENERATION WITH MOBILE CAMERA

This application is a national stage application under 35 U.S.C. of § 371 of International Application No. PCT/US2020/035692, filed on Jun. 2, 2020, which is incorporated herein by reference in its entirety.

BACKGROUND

In image processing, "image stitching" is a process that involves combining together several individual image frames into a composite image, for example, a panoramic image. While many approaches exist, most stitching algorithms rely on individual image frames that contain at least some overlapping regions. Such stitching algorithms generally identify distinctive features in the overlapping regions and then match the features to establish correspondences between the individual image frames. After that, the stitching algorithms generally blend together corresponding image frames at the overlapping regions to create a final composite image.

SUMMARY

Example embodiments involve a computing device that performs image stitching. The computing device may include a base frame selection module operable to select one or more base frames from a plurality of image frames. The computing device may also include a stitching module operable to stitch together the one or more selected base frames. Using these two modules, the computing device could generate composite images, such as panoramic images, and then display those composite images to users.

In a first aspect, a computer-implemented method is provided. The method includes obtaining, by a computing device, a plurality of image frames. The method also includes identifying, by the computing device, one or more regions of interest within one or more image frames in the plurality of image frames. The method further includes selecting, by the computing device and based on a respective quality measure associated with each image frame of the plurality of image frames, a set of base frames, where each identified region of interest of the one or more identified regions of interest is fully contained within at least one base frame in the selected set of base frames. The method additionally includes stitching together, by the computing device, the selected set of base frames to create a composite image.

In a second aspect, a computing device is provided. The computing device may include one or more processors. The computing device may also include non-transitory data storage storing at least computer-readable instructions that, when executed by the one or more processors, cause the computing device to perform operations. The operations may include obtaining a plurality of image frames. The operations may also include identifying one or more regions of interest within one or more image frames in the plurality of image frames. The operations may further include selecting, based on a respective quality measure associated with each image frame of the plurality of image frames, a set of base frames, where each identified region of interest of the one or more identified regions of interest is fully contained within at least one base frame in the selected set of base frames. The operations may additionally include stitching together the selected set of base frames to create a composite image.

In a third aspect, an article of manufacture is provided. The article of manufacture may include non-transitory data storage storing at least computer-readable instructions that, when executed by one or more processors of a computing device, cause the computing device to perform operations. The operations may include obtaining a plurality of image frames. The operations may also include identifying one or more regions of interest within one or more image frames in the plurality of image frames. The operations may further include selecting, based on a respective quality measure associated with each image frame of the plurality of image frames, a set of base frames, where each identified region of interest of the one or more identified regions of interest is fully contained within at least one base frame in the selected set of base frames. The operations may additionally include stitching together the selected set of base frames to create a composite image.

In a fourth aspect, a system is provided. The system may include means for obtaining a plurality of image frames. The system may also include means for identifying one or more regions of interest within one or more image frames in the plurality of image frames. The system may further include means for selecting, based on a respective quality measure associated with each image frame of the plurality of image frames, a set of base frames, where each identified region of interest of the one or more identified regions of interest is fully contained within at least one base frame in the selected set of base frames. The system may additionally include means for stitching together the selected set of base frames to create a composite image.

Other aspects, embodiments, and implementations will become apparent to those of ordinary skill in the art by reading the following detailed description, with reference where appropriate to the accompanying drawings.

DETAILED DESCRIPTION

Figure 1:
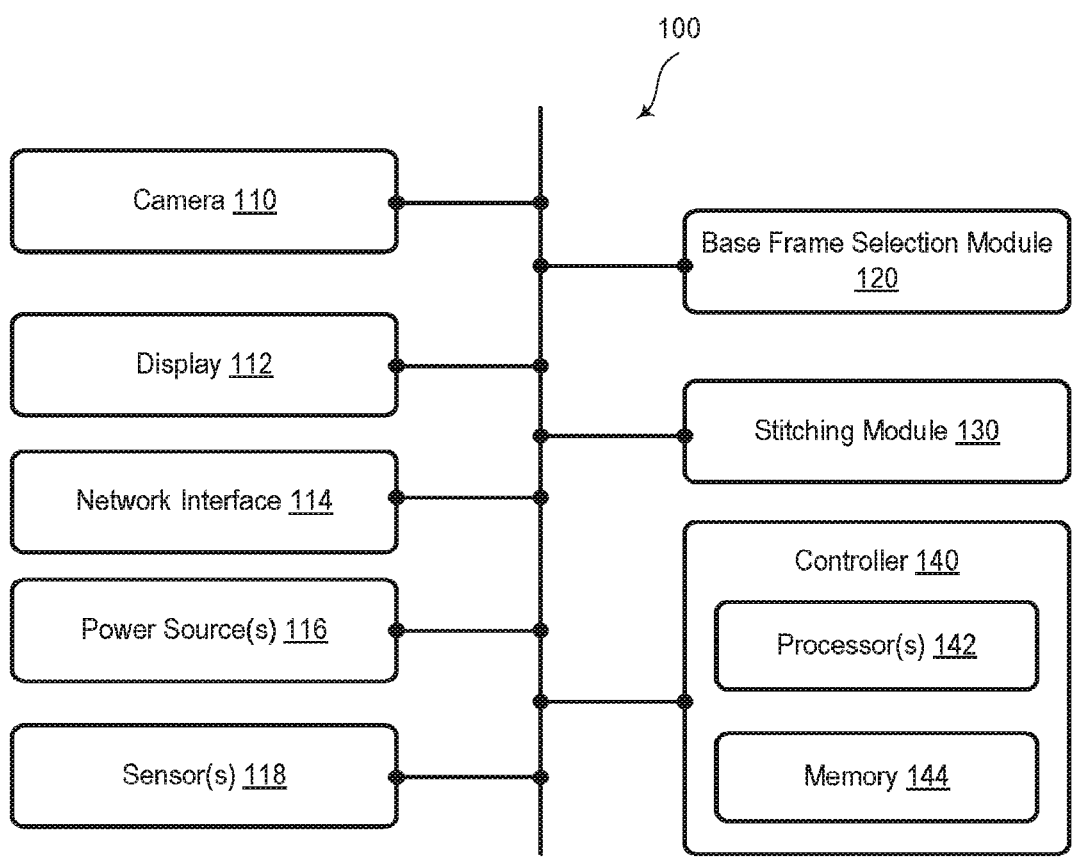
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For the purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Some example image stitching processes include four phases: base frame selection, feature detection, alignment, and blending. The base frame selection phase involves selecting one or more base frames from a set of candidate base frames. The feature detection phase involves identifying corresponding features in the one or more selected base frames. The alignment phase involves transforming at least some of the one or more selected base frames to align the identified features. And the blending phase involves merging together the aligned frames into a single composite image.

Many image stitching processes include a base frame selection phase that does not attempt to discriminate between objects of interest and background objects. As a result, such image stitching processes often select base frames containing low quality representations of objects of interest therein; that is, objects of interest that are blurred, underexposed, and/or otherwise distorted in some way. This problem can be disadvantageous in terms of image fidelity and could reduce the overall quality of the composite images generated from these image stitching processes. Notably, even if the distortions to the objects of interest are relatively minor, those distortions can be particularly noticeable on the composite images and may represent a meaningful degradation in image quality.

Many image stitching processes include a blending phase that also does not attempt to discriminate between objects of interest and background objects. As a result, when blending together two image frames, such image stitching processes often place seams directly over objects of interest, thereby causing artifacts and/or other distortions to appear on those objects of interest. This problem can also be disadvantageous in terms of image fidelity and could also reduce the overall quality of the composite images generated from these image stitching processes.

The present disclosure provides for an image stitching process that may help to address these issues. More specifically, example image stitching processes intelligently select base frames by considering the quality of the objects of interest within a set of candidate base frames. Example image stitching processes may also penalize seams placed on objects of interest during the blending phase. Advantageously, the disclosed image stitching processes allow for the generation of composite images that contain high quality objects of interest therein.

The disclosed process could be implemented by a computing device, such a mobile device, a server device, or another type of computing device. The computing device could include a base frame selection module operable to receive a plurality of image frames and responsively identify regions of interest within the plurality of image frames. The regions of interest could correspond to regions containing objects of interest, such as human faces, buildings, vehicles, or animals, among other possibilities. After identifying the regions of interest, the base frame selection module could select a set of base frames from the plurality of image frames. In particular, the selection may be such that each identified region of interest is fully contained within at least one base frame in the selected set of base frames.

The computing device could also include a stitching module operable to receive the set of base frames selected by the base frame selection module and stitch together the set of base frames to create a composite image. While performing the stitching, the stitching module could implement a seam finding process that adds a computational bias to seams placed on regions of interest within the set of base frames. In some examples, this computational bias involves adding a penalty term to any seam that contains pixels from the regions of interest.

In some examples, the disclosed process is implemented by the same device that captured the one or more image frames. For instance, the base frame selection module and the stitching module can be installed on a computing device. Then, after the computing device captures one or more image frames, the base frame selection module can be invoked to select a set of base frames from the one or more image frames. Then, the stitching module could be invoked to create a composite image from the set of base frames. The composite image can be displayed, communicated, stored, and/or otherwise utilized; e.g., printed to paper. In other examples, the base frame selection and/or stitching processes may be implemented by a device that is separate but communicatively coupled to the device that captured the one or more image frames.

In some examples, frames may be stitched together from a successive image stream (e.g., a video stream). The image stream may be captured by a front facing camera (e.g., user facing) of a computing device, a rear facing camera (e.g., non-user facing) of the computing device, or another camera of the computing device. In some cases, the successive image stream may be captured using multiple cameras of the computing device, for example, the front facing camera and the rear facing camera.

In some examples, a composite image may be generated with minimal or no user input. For instance, the composite image may be generated without requesting that a user identify regions of interest, objects of interests, or other aspects of an image frame. Additionally, the composite image may be generated without requesting that the user capture the one or more image frames using a specific gesture (e.g., scanning a scene horizontally with the computing device). Automatic image stitching applications may benefit by not requiring such user inputs. However, variations of the herein-described processes with one or more types of user input are contemplated as well.

In some examples, the computing device may select base frames by using a machine learning model that is trained based on base frame selection decisions by the computing device. For example, after the computing device makes a few (e.g., 4 to 10) base frame selection decisions using the base frame selection module described herein, the computing device could use the base frame selection decisions to train a machine learning model. After training is complete, the computing device could use the trained machine learning model in combination with the described base frame selection module to intelligently select base frames. Other ways of selecting base frames are also possible.

With respect to embodiments that include selecting base frames using a machine learning model, interactions by the computing device with server devices, or otherwise involve sharing base frames or composite images with other computing devices, a user may be provided with controls allowing the user to make an election as to both if and when systems, programs, devices, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

II. Example Computing Devices

FIG. 1 illustrates computing device 100, in accordance with example embodiments. Computing device 100 may be an example computing device that could select base frames from a plurality of image frames and then stitch together the selected base frames to create a composite image. Computing device 100 may take various forms, such as a server device, a mobile device, a camera device, or some other form of device.

As shown in FIG. 1, computing device 100 could include camera 110. Camera 110 can include one or more image capture devices, such as still and/or video cameras, equipped to capture light and record the captured light in one or more image frames. That is, camera 110 can generate image frame(s) of captured light. The one or more image frames can be one or more still image frames and/or one or more image frames utilized in video imagery (e.g., a continuous stream of image frames). Camera 110 can capture light and/or electromagnetic radiation emitted as visible light, infrared radiation, ultraviolet light, and/or as one or more other frequencies of light.

Camera 110 could be configured as a front facing camera (e.g., user facing) and/or a rear facing camera (e.g., non-user facing) of computing device 100. In some implementations, camera 110 could capture image frames at a pre-configured frame rate. That is, every X seconds, camera 110 could capture an image frame. Example frame rates include 24 frames per second (FPS), 30 FPS, or 50 FPS, among other possibilities.

In some examples, camera 110 could be oriented at a specific rotation angle and may capture image frames at that rotation angle. In some implementations, the rotation angle is a horizontal angle. That is, the rotation angle may be the horizontal rotation of camera 110 from an initial pointing direction. In other implementations, the rotation angle is a vertical angle. That is, the rotation angle may be the vertical rotation of camera 110 from an initial pointing direction. In example embodiments, the initial pointing direction may correspond to the pointing direction of camera 110 as it captures a first image frame in a stream of image frames.

In example embodiments, each image frame captured by camera 110 may be associated with a quality measure. This quality measure may be a quantitative metric that is calculated based on the motion blur of the captured image frame, the overall focus of the captured image frame, and/or the exposure of the captured image frame, among other possibilities. In some implementations, the quality measure for a captured image frame may be computationally biased to give greater weight to pixels that are located within the regions of interest disposed within the captured image frame. For instance, the quality measure for an image frame with underexposed regions of interest but properly exposed background objects may be lower than the quality measure for an image frame with properly exposed regions of interest but underexposed background objects.

Display component 112 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Display component 112 may also be configured to generate audible outputs, such as with a speaker, speaker jack, audio output port, audio output device, earphones, and/or other similar devices. Display component 112 may further be configured with one or more haptic components that can generate haptic outputs, such as vibrations and/or other outputs detectable by touch and/or physical contact with computing device 100.

Network interface 114 may serve as an interface between computing device 100 and other computing devices. Network interface 114 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 114 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Power source(s) 116 could be configured to supply power to various components of computing device 100. Power source(s) 116 may include a hydraulic system, electrical system, batteries, or other types of power sources. Some components of computing device 100 may each connect to a different power source, may be powered by the same power source, or be powered by multiple power sources. Power source(s) 116 may charge using various types of charging, such as wired connections to an outside power source, wireless charging, combustion, or other examples.

Sensor(s) 118 can be configured to measure conditions in an environment of computing device 100 and provide data about that environment. For example, sensor(s) 118 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (ii) sensors to measure locations and/or movements of computing device 100, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 100, such as, but not limited to, an infrared sensor, an optical sensor, a light sensor, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 100, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 118 are possible as well.

Base frame selection module 120 may be a software application or subsystem within computing device 100 that is operable to receive one or more image frames and responsively select base frames from the one or more image frames. In some implementations, base frame selection module 120 may receive the one or more image frames from camera 110. In other implementations, base frame selection module 120 may receive the one or more image frames from another computing device via network interface 114. After selecting the base frames, base frame selection module 120 could transmit the selected base frames to stitching module 130.

Stitching module 130 may be a software application or subsystem within computing device 100 that is operable to receive base frames selected by base frame selection module 120 and stitch together the base frames to create a single composite image, such as a panoramic image. The composite image generated by stitching module 130 could be displayed to a user via display 112 or could be communicated to a separate computing device via network interface 114.

Figure 2:
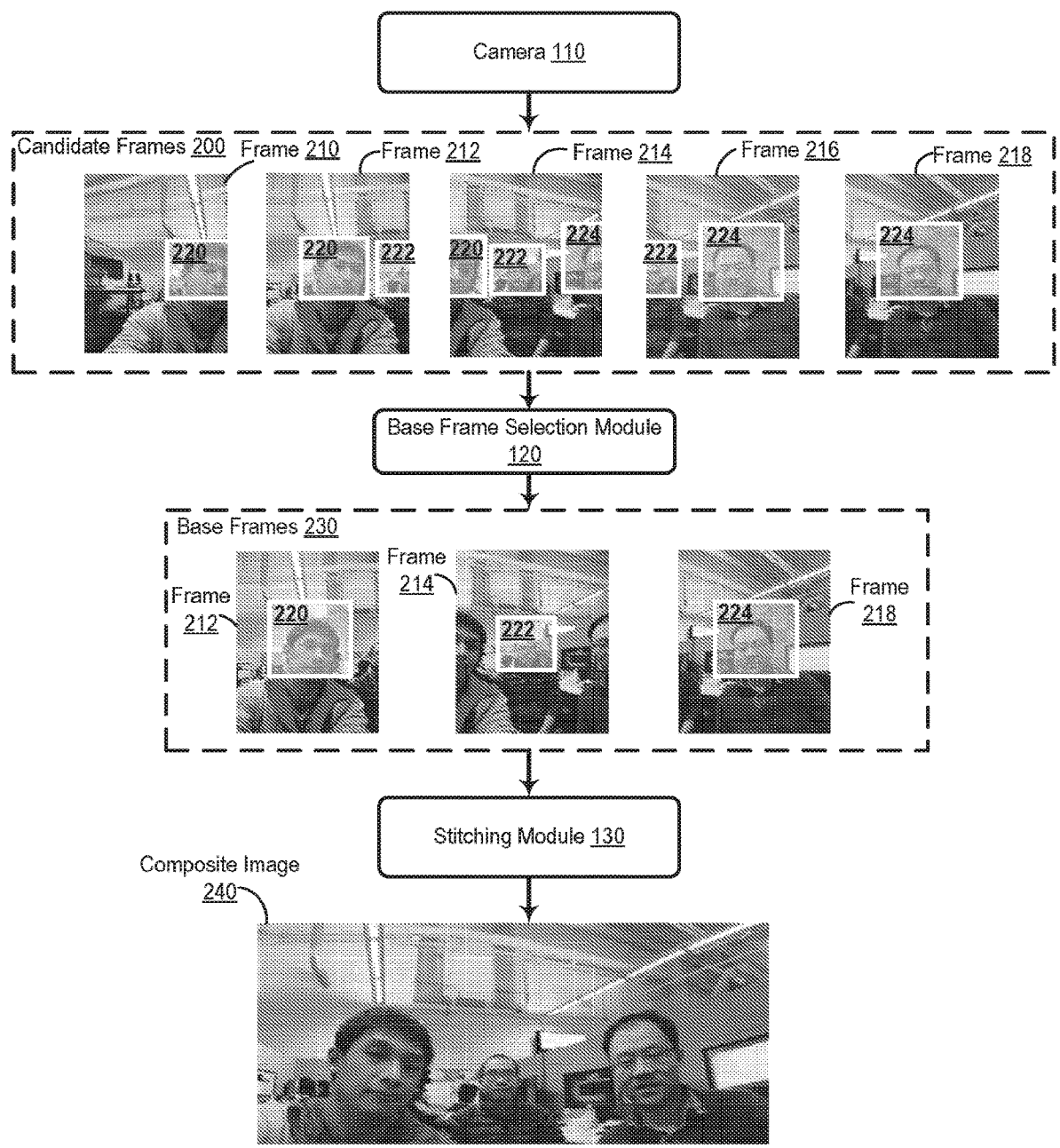
FIG. 2 depicts an overview of the operations of a base frame selection module and a stitching module, in accordance with example embodiments.

To conceptually illustrate example operations of base frame selection module 120 and stitching module 130, FIG. 2 is provided. In particular, FIG. 2 shows how base frame selection module 120 could receive candidate image frames 200 from camera 110 and select base frames 230 from candidate image frames 200. After the selection, base frame selection module 120 could provide base frames 230 to stitching module 130, which could stitch together base frames 230 to produce composite image 240.

As shown, candidate image frames 200 include five separate image frames: image frame 210, image frame 212, image frame 214, image frame 216, and image frame 218. Those five separate image frames include three regions of interest: region of interest 220, region of interest 222, and region of interest 224. Each of these three regions of interest can either be: (i) fully contained in an image frame, (ii) partially contained in an image frame, or (iii) not contained in an image frame. For instance, region of interest 220 is fully contained in image frame 212, partially contained in image frames 210 and 214, and not contained in image frames 216 and 218. Similarly, region of interest 222 is fully contained in image frame 214, partially contained in image frames 212 and 216, and not contained in image frames 210 and 218. Further, region of interest 224 is fully contained in both image frame 216 and 218, partially contained in image frame 214, and not contained in image frames 210 and 212.

In line with the discussion above, base frame selection module 120 may select base frames from candidate image frames 200 such that each identified region of interest in candidate image frames 200 is fully contained within at least one base frame in base frames 230. For example, as shown in FIG. 2, regions of interest 220, 222, and 224 are fully contained in at least one of the base frames 230. Specifically, region of interest 220 is fully contained in image frame 212, region of interest 222 is fully contained in image frame 214, and region of interest 224 is fully contained in image frame 218.

The image frames presented in FIG. 2 are used for the purpose of example and are not intended to be limiting with respect to the embodiments herein. In practice, candidate image frames 200 and base frames 230 could include a fewer number of frames or a greater number of frames, including hundreds or thousands of frames.

Returning back to FIG. 1, computing device 100 also includes controller 140. Controller 140 could include at least one of a field-programmable gate array (FPGA) or an application-specific integrated circuit (ASIC). Additionally or alternatively, controller 140 may include one or more processors 142 and memory 144. Processor(s) 142 may include a general-purpose processor or a special-purpose processor (e.g., digital signal processors, etc.). Processor(s)

142 may be configured to execute computer-readable program instructions that are stored in memory 144.

Memory 144 may include or may take the form of one or more computer-readable storage media that may be read or accessed by processor(s) 142. The one or more computer-readable storage media can include volatile and/or non-volatile storage components, such as optical, magnetic, organic or other memory or disc storage, which may be integrated in whole or in part with at least one of the one or more processors 142. In some embodiments, memory 144 may be implemented using a single physical device (e.g., one optical, magnetic, organic or other memory or disc storage unit), while in other embodiments, memory 144 can be implemented using two or more physical devices.

As noted, memory 144 may include computer-readable program instructions that relate to operations of computing device 100. As such, memory 144 may include program instructions to perform or facilitate some or all of the functionality described herein. Memory 144 may store base frame selection module 120 and/or stitching module 130. In some embodiments, controller 140 may carry out various operations by way of processor(s) 142 executing instructions stored in the memory 144.

For example, controller 140 may instruct camera 110 to capture the one or more image frames according to one or more image capture properties. The image capture properties could include a desired aperture, desired exposure time, and/or a desired image sensor light sensitivity (e.g., ISO sensitivity), among other possibilities. As another example, controller 140 may instruct camera 110 to adjust its focal length according to one or more configuration properties. The configuration properties could include a desired focal distance, a desired magnification, and/or a desired angle of view, among other possibilities.

Controller 140 could be configured to carry out other operations. For example, controller 140 could execute the operations of base frame selection module 120 and stitching module 130 in order to generate composite images from the image frames captured by camera 110. Controller 140 could then cause display 112 to display the composite images or could cause network interface 114 to transmit the composite images to a remote computing device, among other possibilities.

III. Example Methods

Figure 3:
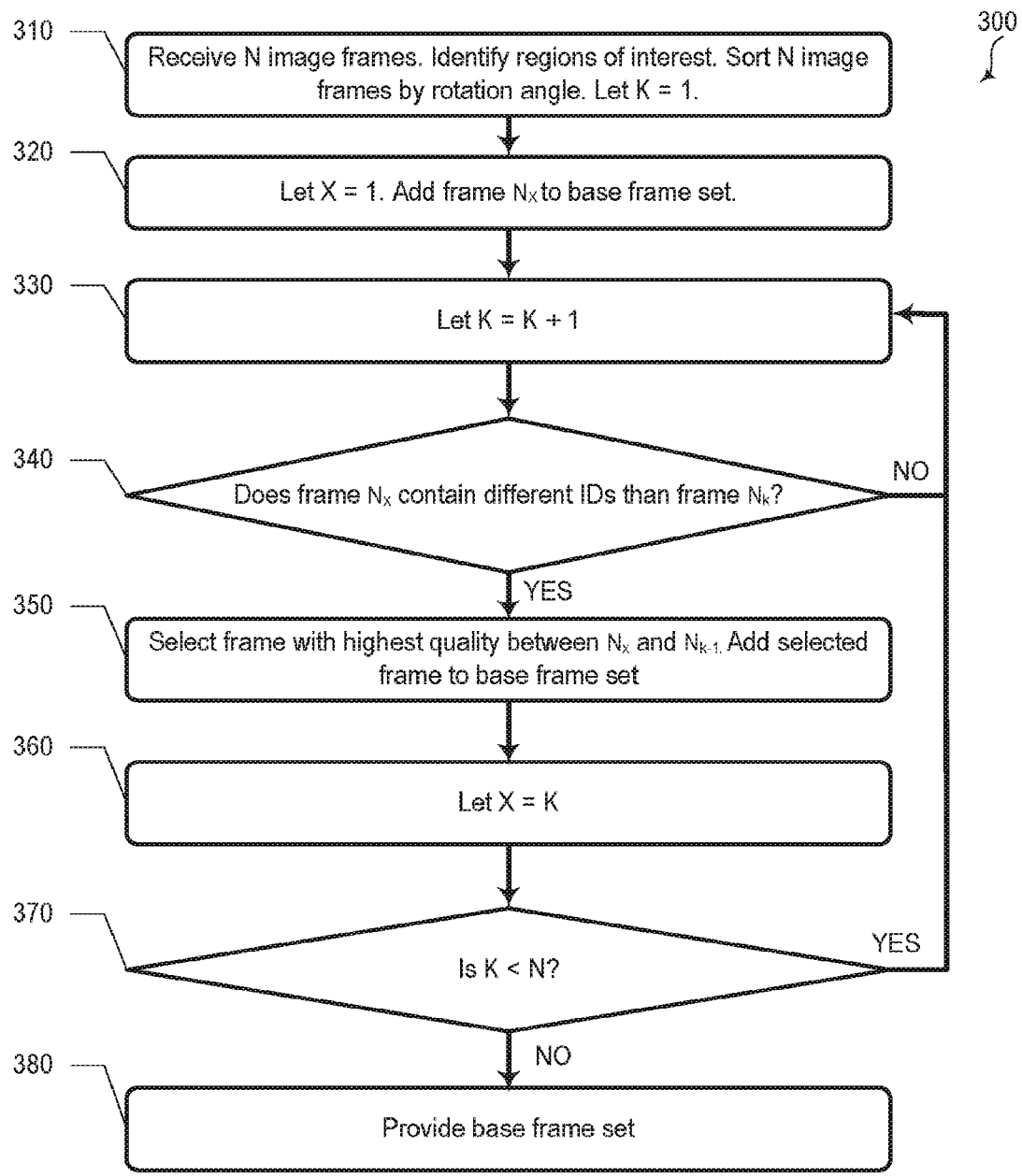
FIG. 3 illustrates operations of a base frame selection module, in accordance with example embodiments.

FIG. 3 illustrates method 300, in accordance with example embodiments. Method 300 could be implemented to select one or more base frames from a plurality of image frames. The selected base frames could be provided to stitching module 130 or could be used for other purposes. Method 300 could be carried out by various components of computing device 100, for example, base frame selection module 120 and/or other components. For simplicity, example implementations of method 300 will now be described using base frame selection module 120. However, it should be understood that the disclosed principles could apply in other scenarios with other components as well.

Method 300 may begin at block 310, where base frame selection module 120 receives N image frames. In line with the discussion above, the N image frames could be image frames that were captured by camera 110. Alternatively and/or additionally, the N image frames could be image frames that were communicated to computing device 100 from a remote computing device, such a server device operating on a remote network.

Upon receiving the N image frames, base frame selection module 120 could identify one or more regions of interest within the N image frames. In some cases, this may involve base frame selection module 120 determining unique identifiers for each of the one or more regions of interest. For instance, upon receiving the N image frames at block 310, base frame selection module 120 could invoke an object detection module to detect objects of interest within the N image frames. Base frame selection module 120 could then assign the detected objects unique identifiers and could store the unique identifiers alongside the N image frames as metadata. Alternatively, base frame selection module 120 could determine the unique identifiers at another point in time. For instance, while executing block 340 (as further described below), base frame selection module 120 could invoke an object detection module to detect objects of interest within image frame $N_k$ and image frame $N_x$. Base frame selection module 120 could then assign the unique identifiers to image frame $N_x$ and image frame $N_k$.

Additionally, at block 310, base frame selection module 120 could order the N image frames by rotation angle, thereby producing an ordered set of N image frames. To do this, base frame selection module 120 could evaluate metadata associated with each image frame and then, based on the metadata, could determine a rotation angle of a camera that captured the image frame as it captured the image frame. In some implementations, base frame selection module 120 could order the N image frames in an increasing order. That is, for any given image frame in the ordering, the next image frame in the ordering would have a rotation angle that is greater than or equal to in magnitude the rotation angle of the given image frame. In other implementations, base frame selection module 120 could order the N image frames in a decreasing order.

After ordering the N image frames by rotational angle (or while ordering the N image frames by rotation angle), base frame selection module 120 could set the value of the variable K to 1.

At block 320, base frame selection module 120 could set the value of the variable X to 1. Then, base frame selection module 120 could add the image frame $N_x$ to a set of selected base frames, where image frame $N_x$ corresponds to the $X^{th}$ image frame from the ordered set of N image frames.

At block 330, base frame selection module 120 could increment the value of K by 1. That is, base frame selection module 120 can let the variable K=K+1. Then at block 340, base frame selection module 120 could determine whether image frame $N_x$ contains different unique identifiers than image frame $N_k$, where image frame $N_k$ corresponds to the $K^{th}$ image frame from the ordered set of N image frames. In line with the discussion above, base frame selection module 120 could use stored metadata to establish whether image frame $N_x$ contains different unique identifiers than image frame $N_k$. In other examples, base frame selection module 120 could invoke an object detection module to establish whether image frame $N_x$ contains different unique identifiers than image frame $N_k$. In either case, if base frame selection module 120 determines that image frame $N_x$ contains different unique identifiers than image frame $N_k$, then method 300 can proceed to block 350. Otherwise, if base frame selection module 120 determines that image frame $N_x$ does not contain different unique identifiers than image frame $N_k$, method 300 can proceed back to block 330.

Figure 4:
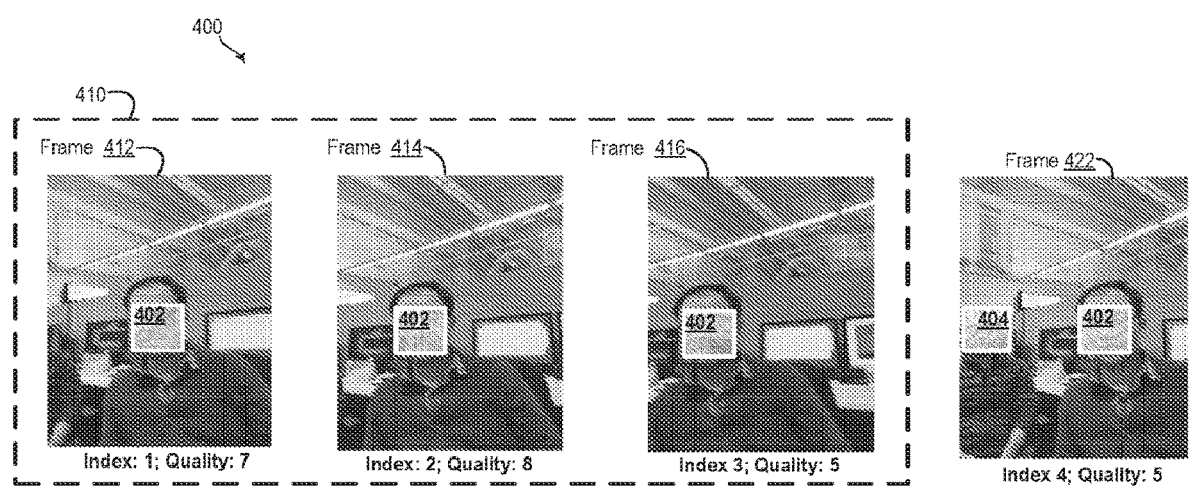
FIG. 4 illustrates an example image frame subset, in accordance with example embodiments.

As an illustrative example related to blocks 330 and 340, FIG. 4 shows an example scenario 400 that includes image frame 412, image frame 414, image frame 416, and image frame 422. In scenario 400, each of image frames 412, 414, 416, and 422 has an index in the ordered set of N image frames. Namely, image frame 412 has a position of 1, image frame 414 has a position of 2, image frame 416 has a position of 3, and image frame 422 has a position of 4. Further, each of image frames 412, 414, 416, and 422 is shown to contain at least one unique identifier. Namely, image frame 412, 414, and 416 include unique identifier 402, and image frame 422 includes unique identifiers 402 and 404.

During scenario 400, base frame selection module 120 may designate image frame 412 as a starting image frame. Then, base frame selection module 120 could evaluate image frame 414 and determine that image frame 414 has the same unique identifiers as image frame 412. Upon making this determination, base frame selection module 120 could iterate to image frame 414 and evaluate image frame 416. Similarly, base frame selection module 120 could determine that image frame 416 has the same unique identifiers as image frame 414. Upon making this determination, base frame selection module 120 could iterate to image frame 416 and then evaluate image frame 422. At this point, base frame selection module 120 could determine that image frame 422 contains different unique identifiers than image frame 416 and thus could stop its iteration. The image frames that were iterated through during scenario 400 (e.g., image frame 412, 414 and 416) may be considered herein to be a subset of image frames 410.

Referring back to FIG. 3, at block 350, base frame selection module 120 could evaluate the quality measure associated with each image frame between (in accordance with the ordering) image frame $N_x$ and image frame $N_{k-1}$, where image frame $N_{k-1}$ corresponds to the $K^{th}-1$ image frame from the ordered set of N image frames. After performing the evaluation, base frame selection module 120 could select an image frame between image frame $N_x$ and image frame $N_{k-1}$ that is associated with the highest quality measure. Alternatively, base frame selection module 120 could select all image frames between image frame $N_x$ and image frame $N_{k-1}$ that have a threshold high quality measure (e.g., have an associated quality measure greater than X). In either scenario, base frame selection module 120 could add the selected image frame(s) to the set of selected base frames.

An example related to block 350 is illustrated in scenario 400 of FIG. 4. In particular, each of image frames 412, 414, 416, and 422 is shown to have an associated quality measure. Namely, image frame 412 has an associated quality measure of 7, image frame 414 has an associated quality measure of 8, image frame 416 has an associated quality measure of 5, and image frame 422 has an associated quality measure of 5. During scenario 400, base frame selection module 120 could evaluate the quality measure associated with each image frame that base frame selection module 120 iterated through. Put differently, base frame selection module 120 could evaluate the quality measure for each image frame in image frame subset 410. Accordingly, because image frame 414 has the highest quality measure amongst the frames in image frame subset 410, base frame selection module 120 may select image frame 414 to use as a base frame and would refrain from selecting image frame 412 and 416 to use as base frames.

Referring back to FIG. 3, at block 360, base frame selection module 120 could set the value of the variable X equal to the value of the variable K.

At block 370, base frame selection module 120 could determine whether the value for the variable K is less than N (i.e., the number of image frames received at block 310). If base frame selection module 120 determines that the value for the variable K is less than N, then method 300 can proceed back to block 330. Otherwise, if base frame selection module 120 determines that the value for the variable K is not less than N, then method 300 can proceed to block 380.

At block 380, base frame selection module 120 could provide the set of selected base frames that were determined from blocks 310 to 370. In some instances, base frame selection module 120 could provide the selected set of base frames to stitching module 130. In other instances, base frame selection module 120 could provide the selected set of base frames to a remote computing device.

The blocks represented in FIG. 3 are used for the purpose of example and are not intended to be limiting with respect to the embodiments herein. The operations of base frame selection module 120 may be highly configurable and may include more blocks, fewer blocks, or different blocks than those depicted in method 300. In some cases, one or more blocks may be customized, or may otherwise deviate from the example description above.

Figure 5:
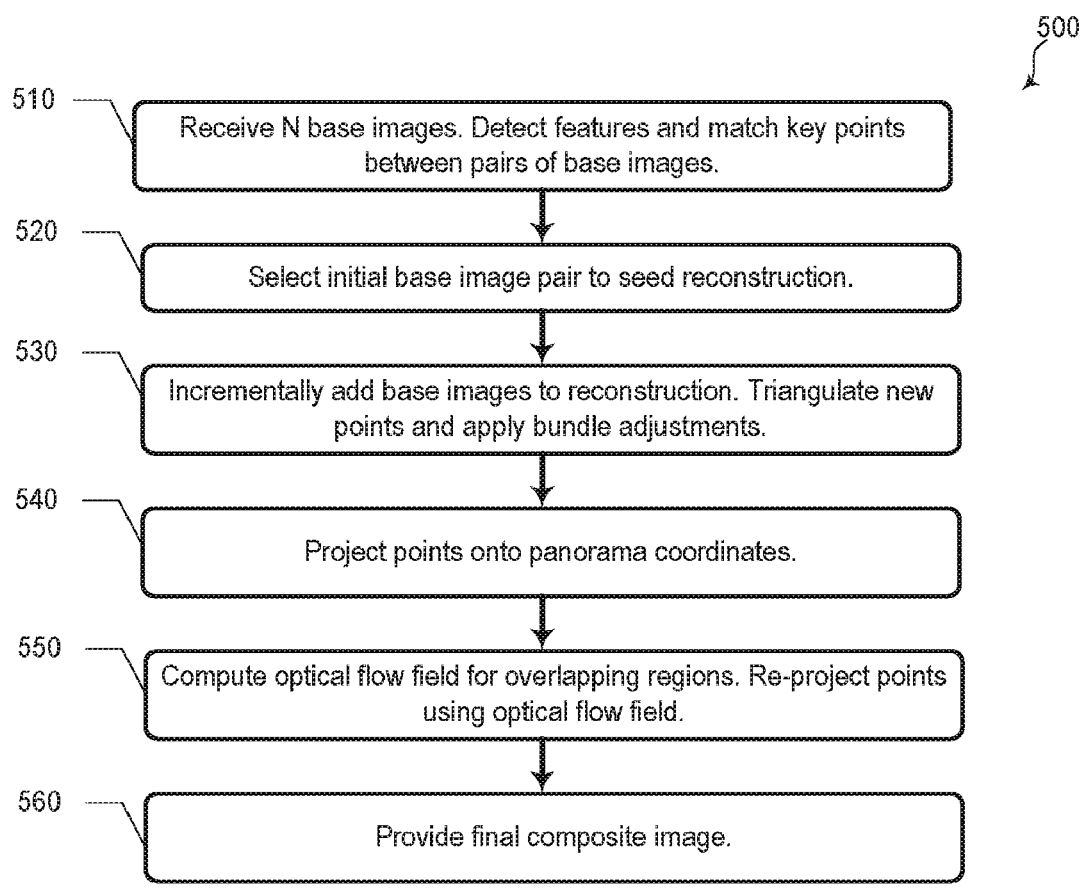
FIG. 5 illustrates operations of a stitching module, in accordance with example embodiments.

FIG. 5 illustrates method 500, in accordance with example embodiments. Method 500 could be implemented to stitch together one or more base frames to produce a single composite image. Method 500 could be carried out by various components of computing device 100, for example, stitching module 130 and/or other components. For simplicity, example implementations of method 500 will now be described using stitching module 130. However, it should be understood that the disclosed principles could apply in other scenarios with other components as well.

Method 500 may begin at block 510, where stitching module 130 receives N base frames. In line with the discussion above, the N base frames could be base frames that were selected by base frame selection module 120. Alternatively and/or additionally, the N base frames could be base frames that are communicated to computing device 100 from a remote computing device, such a server device operating on a remote network.

After receiving the N base frames, stitching module 130 could perform feature and key point detection on each of the N base frames. More specifically, for each base frame, stitching module 130 could detect a collection of local features that describe points of interest (e.g., key points) in the base frame. Various approaches can be used to efficiently detect key points, including scale-invariant feature transformation (SIFT), speeded up robust features (SURF), KAZE, and oriented FAST and rotated BRIEF (ORB), among other possibilities. Once the key points and their associated descriptions are obtained, stitching module 130 could match key points from different base frames to determine pairs of overlapping base frames; e.g., base frames that contain at least some overlapping regions. Various approaches can be used to efficiently match key points, including cascade hashing, k-Nearest Neighbors based approaches, and brute force matchers, among other possibilities.

At block 520, stitching module 130 could select, from the pairs of overlapping base frames determined at block 510, an initial pair of base frames. In some implementations, stitching module 130 may select a pair of base frames with the most key point matches to be the initial pair. In other implementations, stitching module 130 may select a pair of base frames with the highest combined quality measure to be the initial pair. Other implementations are also possible. After selecting the initial pair of base frames, stitching module 130 could apply triangulation to determine three-dimensional (3-D) coordinates for the key points in the initial pair of base frames. Various approaches could be used to implement triangulation, including direct linear triangulation approaches, midpoint triangulation approaches, and non-linear triangulation approaches, among other possibilities.

At block 530, stitching module 130 could incrementally add base frames to the initial 3-D coordinates of block 520. More specifically, for each newly added base frame, stitching module 130 could evaluate correspondences between key points of the new base frame and the previously added base frames and then could apply triangulation to determine 3-D coordinates for new key points. Further, for each newly added base frame, stitching module 130 could apply bundle adjustments to reduce inaccuracies and produce optimal values for the 3D coordinates. The operations of block 530 may be repeated until all N base frames have been evaluated.

Figure 6:
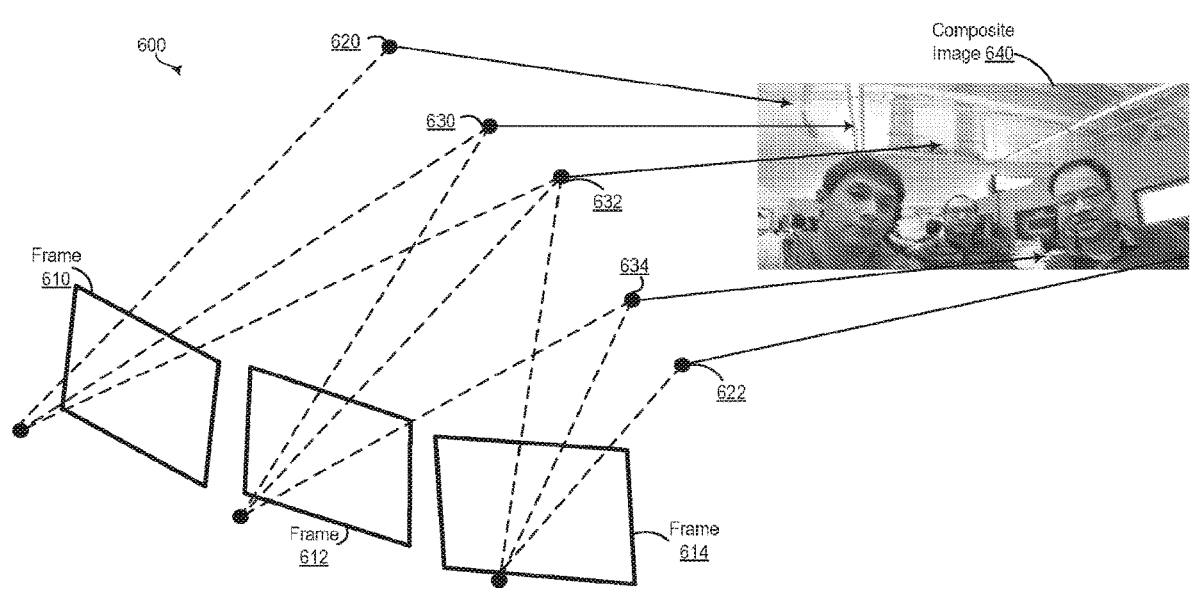
FIG. 6 depicts example image frame projections, in accordance with example embodiments.

As an example related to block 530, FIG. 6 shows an example scenario 600 that includes base frame 610, base frame 612, and base frame 614. FIG. 6 shows how base frames 610 and 612 share the 3-D coordinate 630, how base frames 610, 612, and 614 share the 3-D coordinate 632, and how base frames 612 and 614 share the 3-D coordinate 634. FIG. 6 also shows how base frame 610 has a 3-D coordinate 620 that is not shared with any other base frame and how base frame 614 has a 3-D coordinate 622 that is not shared with any other base frame. Further, FIG. 6 shows how 3-D coordinates 620, 622, 630, 632, and 634 can all be projected to form composite image 640.

Referring back to FIG. 5, at block 540, stitching module 130 may project the 3-D coordinates computed at block 530 onto a panoramic coordinate system. The panoramic coordinate system may be selected with respect to one of the N base frames. Once the 3-D coordinates have been mapped onto the panoramic coordinate system, stitching module 130 may blend the pixels from the N base images onto the panoramic coordinate system. In some embodiments, the blending may include a seam finding process that places seams in the overlapping regions between pairs of base frames so that the transitions from one base frame to another are smooth and less visible. In some embodiments, this seam finding process involves adding a computational bias to seams that contain pixels from the one or more identified regions of interest. For example, the computational bias may include adding a penalty term to any seam that contains pixels from the one or more identified regions of interest.

Figure 7:
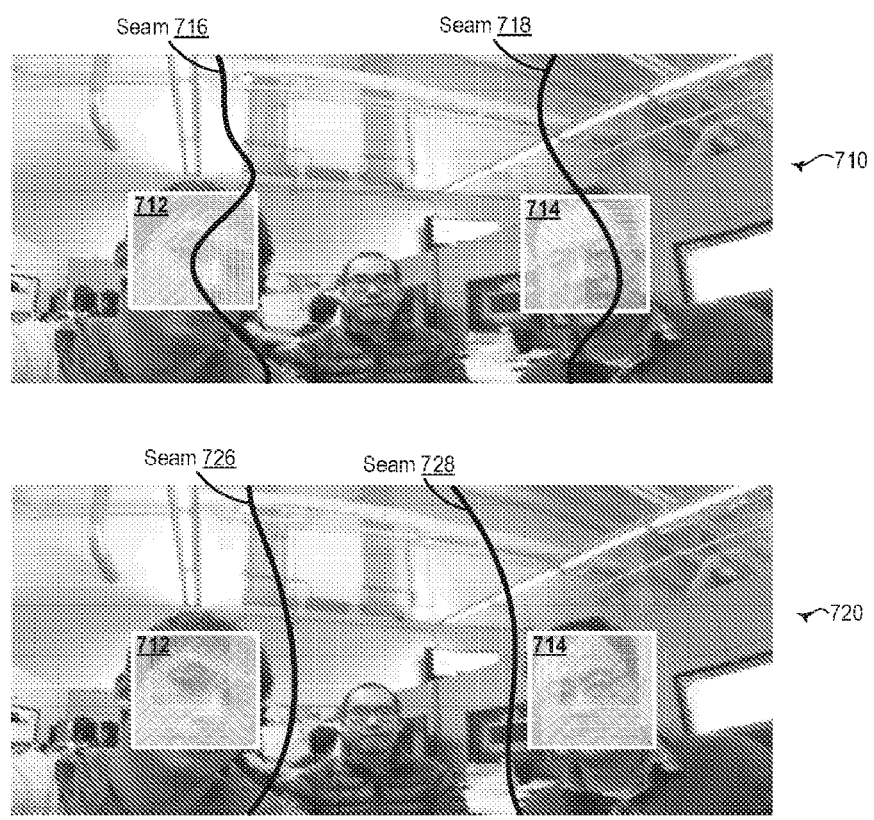
FIG. 7 depicts example seams, in accordance with example embodiments.

As an example related to block 540, FIG. 7 illustrates two example composite images: composite image 710 and composite image 720. Both composite image 710 and 720 contain region of interest 712 and region of interest 714. Notice that in composite image 710, part of seam 716 is positioned on region of interest 712 and part of seam 718 is positioned on region of interest 714. In line with the discussion above, this positioning of seams 716 and 718 could cause regions of interest 712 and 714 to display undesirable artifacts. In contrast, notice that in composite image 720, seam 726 is not positioned on region of interest 712 and seam 728 is not positioned on region of interest 714. This may be the result of the penalty term described above and may yield a composite image with higher quality regions of interest therein.

Referring back to FIG. 5, at block 550, stitching module 130 could locate all overlapping regions in the panoramic projection from block 540 and then compute an optical flow field for each of these overlapping regions. In some embodiments, the optical flow field is calculated by dividing each overlapping region into a grid of non-overlapping cells and representing the flow of a pixel in a cell as a bilinear combination of the flow at the four corners of the cell that contains it.

After computing the optical flow fields, stitching module 130 could apply the optical flow fields to simultaneously align all of the corresponding 3-D coordinates from the overlapping regions of block 530. Stitching module 130 could then re-project the 3-D coordinates onto the panoramic coordinate system to produce a final composite image.

At block 560, stitching module 130 could provide the composite image determined at block 550. In some instances, stitching module 130 could provide the composite image to display 112, which in turn could display the composite image to a user. In other instances, stitching module 130 could provide the composite image to a remote computing device via network interface 114.

IV. Example Operations

Figure 8:
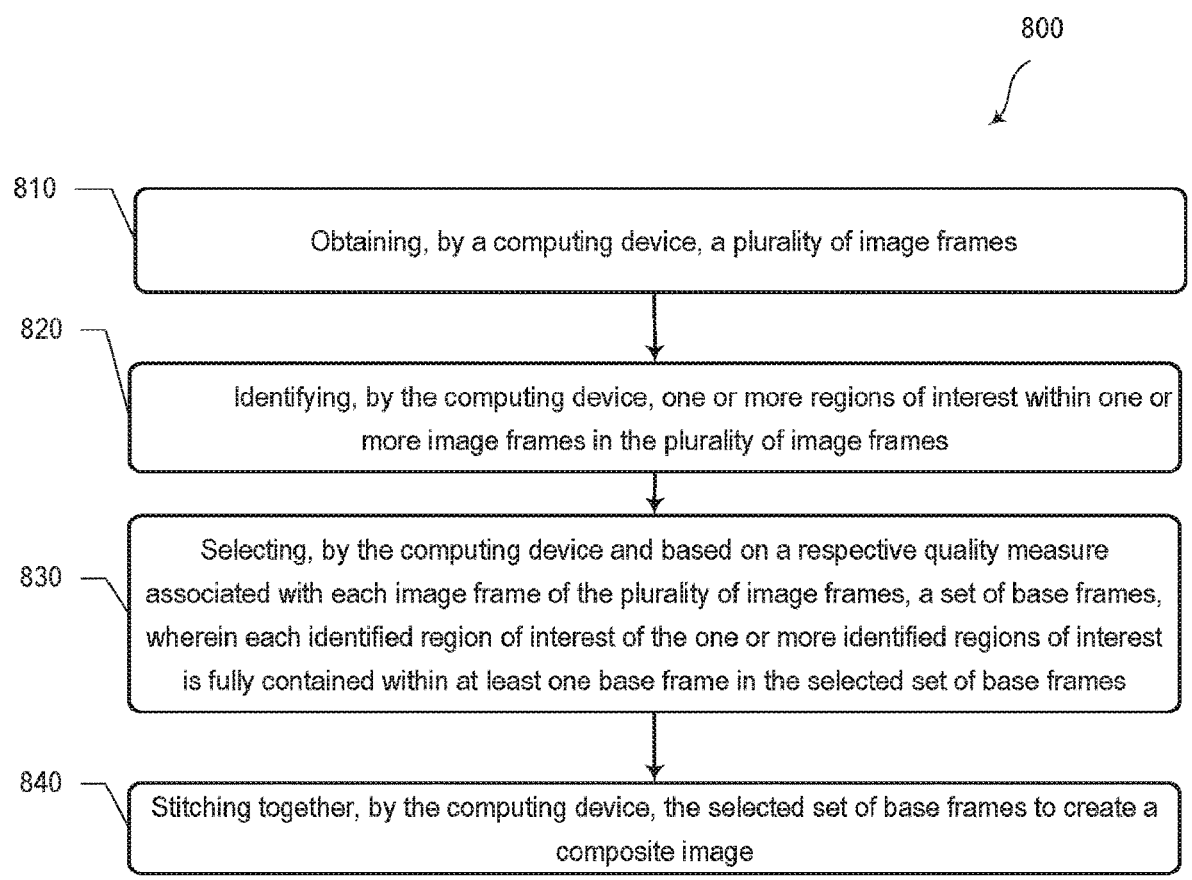
FIG. 8 illustrates a method, in accordance with example embodiments.

FIG. 8 illustrates method 800, in accordance with example embodiments. Method 800 may include various blocks or steps. The blocks or steps may be carried out individually or in combination. The blocks or steps may be carried out in any order and/or in series or in parallel. Further, blocks or steps may be omitted or added to method 800. The blocks of method 800 may be carried out by various elements of computing device 100 as illustrated and described in reference to FIG. 1.

Block 810 may involve obtaining a plurality of image frames. In some embodiments, the plurality of image frames are captured by a camera device in one continuous stream. Further, in some embodiments, the plurality of image frames are captured using a front facing camera of a camera device.

Block 820 may involve identifying one or more regions of interest within one or more image frames in the plurality of image frames. In some embodiments, each of the one or more regions of interest corresponds to a region containing a face.

Block 830 may involve selecting, based on a respective quality measure associated with each image frame of the plurality of image frames, a set of base frames, where each identified region of interest of the one or more identified regions of interest is fully contained within at least one base frame in the selected set of base frames.

Block 840 may involve stitching together the selected set of base frames to create a composite image.

In some embodiments, the respective quality measure associated with each image frame of the plurality of image frames is a metric based on at least one of: motion blur of the image frame, focus of the image frame, or exposure of the image frame. Further, in some embodiments, the respective quality measure is computationally biased to give greater weight to pixels that are located within the one or more identified regions of interest In some embodiments, selecting the set of base frames involves determining, from the plurality of image frames, a plurality of subsets of image frames, where each of the subsets comprises image frames that contain the same one or more regions of interest; and selecting, from each of the subsets and based on the respective quality measure associated with each image frame in the subset, a base frame.

In some embodiments, selecting the base frame from each of the subsets involves selecting an image frame with the highest quality measure from amongst the image frames of the subset.

In some embodiments, identifying the one or more regions of interest involves determining unique identifiers for each of the one or more regions of interest, and each of the subsets comprises one or more image frames that contain the same unique identifiers.

In some embodiments, each image frame of the plurality of image frames was captured by a camera device at a respective rotation angle. In such embodiments, determining a subset of image frames involves: ordering the plurality of image frames based on rotation angle; designating a starting image frame from the plurality of image frames; and beginning from the starting image frame, iterating through the plurality of image frames according to the ordering until the next image frame to be iterated through is an image frame with at least one different unique identifier than the starting image frame. In such embodiments, the subset of image frames is the image frames that were iterated through.

In some embodiments, the rotation angle comprises a measure based on a horizontal angle of the camera device.

In some embodiments, designating the starting image frame involves designating a first image frame from the ordering.

In some embodiments, the subset of image frames is a first subset of image frames. In such embodiments, determining a second subset of image frames involves: designating a second starting image frame from the plurality of image frames; and beginning from the second starting image frame, iterating through the plurality of image frames according to the ordering until the next image frame to be iterated through is an image frame with at least one different unique identifier than the second starting image frame. In such embodiments, the second subset of image frames are the image frames that were iterated through beginning from the second starting image frame.

In some embodiments, designating the second starting image frame involves designating the image frame with at least one different unique facial identifier than the starting image frame.

In some embodiments, the stitching occurs after each image frame from the plurality of image frames has been iterated through at least once.

In some embodiments, the stitching involves a seam finding process that involves adding a computational bias to seams that contain pixels from the one or more identified regions of interest. In such embodiments, the computational bias may involve adding a penalty term to any seam that contains pixels from the one or more identified regions of interest.

Some embodiments involve an optical flow seam repair step that involves determining overlapping regions for the selected of set of base frames; computing respective optical flow fields for each of the overlapping regions; and applying the computed optical flow fields to align the overlapping regions.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

We claim:

1. A computer-implemented method comprising:
   obtaining, by a computing device, a plurality of image frames;
   identifying, by the computing device, one or more regions of interest (ROI) within one or more image frames in the plurality of image frames;
   associating each identified ROI within the one or more image frames with a respective identifier, wherein two different ROIs are associated with two different identifiers;
   selecting, by the computing device and based on a respective quality measure associated with each image frame of the plurality of image frames, a set of base frames, wherein each identified region of interest of the one or more identified regions of interest is fully contained within at least one base frame in the selected set of base frames, and wherein the selecting of the set of base frames further comprises:
   comparing one or more current identifiers in a current frame with previous identifiers in previous frames to determine that a current ROI in the current frame does not appear in the previous frames, wherein the previous frames are subsequent to a previously selected base frame, and
   upon a determination that the current ROI in the current frame does not appear in the previous frames, adding the current frame to the set of base frames; and
   stitching together, by the computing device, the selected set of base frames to create a composite image.

2. The computer-implemented method of claim 1, wherein each of the one or more regions of interest corresponds to a region containing a face.

3. The computer-implemented method of claim 1, wherein the respective quality measure associated with each image frame of the plurality of image frames comprises a metric based on at least one of: motion blur of the image frame, focus of the image frame, or exposure of the image frame.

4. The computer-implemented method of claim 1, wherein the respective quality measure is computationally biased to give greater weight to pixels that are located within the one or more identified regions of interest.

5. The computer-implemented method of claim 1, wherein selecting the set of base frames comprises:
   determining, from the plurality of image frames, a plurality of subsets of image frames, wherein each of the subsets comprises image frames that contain the same one or more regions of interest; and
   selecting, from each of the subsets and based on the respective quality measure associated with each image frame in the subset, a base frame.

6. The computer-implemented method of claim 5, wherein selecting the base frame from each of the subsets comprises selecting an image frame with the highest quality measure from amongst the image frames of the subset.

7. The computer-implemented method of claim 5, wherein identifying the one or more regions of interest comprises determining unique identifiers for each of the one or more regions of interest, and wherein each of the subsets comprises one or more image frames that contain the same unique identifiers.

8. The computer-implemented method of claim 7, wherein each image frame of the plurality of image frames was captured by a camera device at a respective rotation angle, and wherein determining a subset of image frames comprises:
   ordering the plurality of image frames based on rotation angle;
   designating a starting image frame from the plurality of image frames; and
   beginning from the starting image frame, iterating through the plurality of image frames according to the ordering until the next image frame to be iterated through is an image frame with at least one different unique identifier than the starting image frame, wherein the subset of image frames comprises the image frames that were iterated through.

9. The computer-implemented method of claim 8, wherein the rotation angle comprises a measure based on a horizontal angle of the camera device.

10. The computer-implemented method of claim 8, wherein designating the starting image frame comprises designating a first image frame from the ordering.

11. The computer-implemented method of claim 8, wherein the subset of image frames is a first subset of image frames, and wherein determining a second subset of image frames comprises:
   designating a second starting image frame from the plurality of image frames; and
   beginning from the second starting image frame, iterating through the plurality of image frames according to the ordering until the next image frame to be iterated through is an image frame with at least one different unique identifier than the second starting image frame, wherein the second subset of image frames comprises the image frames that were iterated through beginning from the second starting image frame.

12. The computer-implemented method of claim 11, wherein designating the second starting image frame comprises designating the image frame with at least one different unique facial identifier than the starting image frame.

13. The computer-implemented method of claim 8, wherein the stitching occurs after each image frame from the plurality of image frames has been iterated through at least once.

14. The computer-implemented method of claim 1, wherein the stitching comprises a seam finding process that involves adding a computational bias to seams that contain pixels from the one or more identified regions of interest.

15. The computer-implemented method of claim 14, wherein the computational bias involves adding a penalty term to any seam that contains pixels from the one or more identified regions of interest.

16. The computer-implemented method of claim 1, further comprising an optical flow seam repair step that involves:
   determining overlapping regions for the selected of set of base frames;
   computing respective optical flow fields for each of the overlapping regions; and
   applying the computed optical flow fields to align the overlapping regions.

17. The computer-implemented method of claim 1, wherein the plurality of image frames are captured by a camera device in one continuous stream.

18. The computer-implemented method of claim 1, wherein the plurality of image frames are captured using a front facing camera of a camera device.

19. A computing device, comprising:
   one or more processors; and
   non-transitory data storage storing at least computer-readable instructions that, when executed by the one or more processors, cause the computing device to perform operations comprising:
      obtaining a plurality of image frames;
      identifying one or more regions of interest (ROI) within one or more image frames in the plurality of image frames;
      associating each identified ROI within the one or more image frames with a respective identifier, wherein two different ROIs are associated with two different identifiers;
      selecting, by the computing device and based on a respective quality measure associated with each image frame of the plurality of image frames, a set of base frames, wherein each identified region of interest of the one or more identified regions of interest is fully contained within at least one base frame in the selected set of base frames, and wherein the selecting of the set of base frames further comprising:
         comparing one or more current identifiers in a current frame with previous identifiers in previous frames to determine that a current ROI in the current frame does not appear in the previous frames, wherein the previous frames are subsequent to a previously selected base frame, and
         upon a determination that the current ROI in the current frame does not appear in the previous frames, adding the current frame to the set of base frames; and
      stitching together the selected set of base frames to create a composite image.

20. An article of manufacture comprising non-transitory data storage storing at least computer-readable instructions that, when executed by one or more processors of a computing device, cause the computing device to perform operations comprising:
   obtaining a plurality of image frames;
   identifying one or more regions of interest (ROI) within one or more image frames in the plurality of image frames;
   associating each identified ROI within the one or more image frames with a respective identifier, wherein two different ROIs are associated with two different identifiers;
   selecting, by the computing device and based on a respective quality measure associated with each image frame of the plurality of image frames, a set of base frames, wherein each identified region of interest of the one or more identified regions of interest is fully contained within at least one base frame in the selected set of base frames, and wherein the selecting of the set of base frames further comprising:
  comparing one or more current identifiers in a current frame with previous identifiers in previous frames to determine that a current ROI in the current frame does not appear in the previous frames, wherein the previous frames are subsequent to a previously selected base frame, and
  upon a determination that the current ROI in the current frame does not appear in the previous frames, adding the current frame to the set of base frames; and
stitching together the selected set of base frames to create a composite image.

21. The computer-implemented method of claim 1, further comprising:
  comparing one or more second current identifiers in a second current frame with second previous identifiers associated with second previous frames to determine that ROIs in the second current frame appear in the second previous frames, wherein the second previous frames are subsequent to a previously selected second base frame, and
  upon a determination that the ROIs in the second current frame appear in the second previous frames, not adding the second current frame to the set of base frames.

* * * * *